United States Patent
Hoshi (10) Patent No.: US 8,800,830 B2
(45) Date of Patent: Aug. 12, 2014

(54) ELECTRICAL DEVICE MOUNTING STRUCTURE ON A MOTORCYCLE

(75) Inventor: Tomohiro Hoshi, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 1635 days.

(21) Appl. No.: 12/034,433

(22) Filed: Feb. 20, 2008

(65) Prior Publication Data
US 2008/0246247 A1 Oct. 9, 2008

(30) Foreign Application Priority Data
Apr. 6, 2007 (JP) .................. 2007-100668

(51) Int. Cl.
*B62J 11/00* (2006.01)
*B62K 11/14* (2006.01)
*B62K 23/02* (2006.01)

(52) U.S. Cl.
CPC .......... *B62K 23/02* (2013.01); *B62K 11/14* (2013.01); *B62J 11/00* (2013.01); *Y10S 224/929* (2013.01)
USPC ........... 224/420; 224/413; 224/450; 224/453; 224/929

(58) Field of Classification Search
USPC ......... 224/413, 448, 450, 459, 929, 419–420, 224/453; 248/229.14, 230.5
See application file for complete search history.

(56) References Cited

U.S. PATENT DOCUMENTS

| | | | | |
|---|---|---|---|---|
| 2,588,671 A | * | 3/1952 | Tringali | 224/454 |
| 3,193,232 A | * | 7/1965 | Hatcher | 248/231.81 |
| 3,380,698 A | * | 4/1968 | Goldberg et al. | 248/229.26 |
| 3,598,295 A | * | 8/1971 | Seegers | 224/456 |
| 3,823,856 A | * | 7/1974 | Uchida | 224/459 |
| 4,071,175 A | * | 1/1978 | Wagnon | 224/414 |
| 4,436,350 A | * | 3/1984 | Jolin | 312/7.1 |
| 4,662,547 A | * | 5/1987 | Villanueva et al. | 224/418 |
| 4,828,151 A | * | 5/1989 | Goss | 224/438 |
| 4,887,753 A | * | 12/1989 | Allen | 224/312 |
| 4,981,243 A | * | 1/1991 | Rogowski | 224/431 |
| 5,005,661 A | * | 4/1991 | Taylor et al. | 180/219 |
| 5,114,060 A | * | 5/1992 | Boyer | 224/413 |
| 5,529,271 A | * | 6/1996 | Dunchock | 248/205.2 |
| 5,813,583 A | * | 9/1998 | Benedeti | 224/483 |
| 5,860,577 A | * | 1/1999 | Dunn | 224/453 |
| 6,484,913 B1 | * | 11/2002 | Hancock et al. | 224/401 |
| 6,644,614 B1 | * | 11/2003 | Chen | 248/316.1 |
| 6,957,755 B2 | * | 10/2005 | Mahoney et al. | 224/413 |
| 2002/0014565 A1 | | 2/2002 | Ase et al. | |
| 2004/0094347 A1 | | 5/2004 | Kakizoe | |
| 2005/0045681 A1 | * | 3/2005 | Hancock et al. | 224/401 |
| 2005/0121483 A1 | * | 6/2005 | Barnes | 224/413 |
| 2006/0053954 A1 | | 3/2006 | Tiong | |

FOREIGN PATENT DOCUMENTS

| | | |
|---|---|---|
| JP | 61-148781 U | 9/1986 |
| JP | 05-116663 A | 5/1993 |
| JP | 05-315772 A | 11/1993 |

(Continued)

*Primary Examiner* — Brian D Nash
*Assistant Examiner* — John Cogill
(74) *Attorney, Agent, or Firm* — Rankin, Hill & Clark LLP (57) ABSTRACT

An electrical device mounting structure on a motorcycle which includes a resilient support member having a spring-flexural resilience and supporting an electrical device unit. The resilient support member has a first portion secured to a vehicle body or a member connected to the vehicle body. The resilient support member also has a second portion provided separate from the first portion and closer to the electrical device. The second portion is supported on the vehicle body or the member connected to the vehicle body via an elastic member having an attenuating property.

12 Claims, 10 Drawing Sheets

(56) References Cited

FOREIGN PATENT DOCUMENTS

| | | |
|---|---|---|
| JP | 2549173 B2 | 8/1996 |
| JP | 11-115856 A | 4/1997 |
| JP | 9-156560 A | 6/1997 |
| JP | 2549173 U | 9/1997 |
| JP | 11-274763 A | 8/1999 |
| JP | 2004-237762 A | 8/2004 |
| JP | 2004-237762 A | 8/2004 |

* cited by examiner

ELECTRICAL DEVICE MOUNTING STRUCTURE ON A MOTORCYCLE

BACKGROUND OF THE INVENTION

1. Field of the Invention

The present invention relates to an improvement of an electrical device mounting structure on a motorcycle, wherein an electrical device is mounted on the vehicle body or a member connected to the vehicle body via a support member.

2. Description of the Related Art

Japanese Utility Model No. 2549173 (JP '173) discloses a structure in which a support member for supporting an electrical device is secured to the vehicle body or a member connected to the vehicle body. In the structure disclosed by JP '173, vibrations of the vehicle body due to the motorcycle traveling on a road and operational vibrations of a motorcycle engine are undesirably transmitted to the electrical device.

Also, Japanese Patent Application Laid-open No. 2004-237762 (JP '762) discloses a structure in which an entire support member for supporting an electrical device is mounted to the vehicle body or a member connected to the vehicle body via a resilient member. In the structure disclosed by JP '762, vibrations transmitted from the vehicle body to the electrical device are absorbed by the resilient member, but when an operator operates a switch operating element mounted on the electrical device, such as a button, a knob, a dial, or the like, a large part of the operator's operating force is also absorbed by the resilient member, wherein a weakened feeling of rigidity results, which deteriorates the operational feeling to the operator.

SUMMARY OF THE INVENTION

The present invention has been derived with the above circumstance in view. An aspect of the present invention is to provide an electrical device mounting structure on a motorcycle of simple structure which absorbs vibrations transmitted from a vehicle body to an electrical device and improves the operational feeling of an operating element to the motorcycle operator.

To achieve the first aspect, according to a first feature of the present invention, an electrical device mounting structure is provided on a motorcycle that includes a resilient support member having a spring-flexural resilience, and an electric device mounting portion for mounting an electrical device thereon. A first portion of the support member is secured to the vehicle body or a member connected to the vehicle body. A second portion of the support plate is provided remote or away from the first portion in a direction toward the electric device mounting portion and is connected to the vehicle body or the member connected to the vehicle body via an elastic member, wherein the elastic member has an attenuating property.

When the motorcycle is being driven on the road by the operator, the vibrations are transmitted to the spring-like flexuraly resilient support member supporting the electrical device and is absorbed due to cooperation between a resonance effect of the resilient support member and the attenuating effect of the elastic member. The cooperation of the respective effects of the resilient support member and elastic member results in the vibration being isolated from the electrical device.

The support member is secured on one portion of the vehicle body or the member connected to the vehicle body. Therefore, when an operating load is applied to the switch operating element of the electrical device, the resilient support member exhibits a relatively large repulsive force to provide a feeling of rigidity to an operator, wherein the operator senses a good or positive operational feeling, e.g., a more stable feeling.

Further, according to the present invention, the resilient support member secured to the vehicle body or the member connected to the vehicle body can isolate a plurality of different kinds of vibrations by adjusting the thickness and shape of the resilient support member, as well as the position where the resilient support member is secured to the vehicle body or the member connected to the vehicle body. That is, the present invention provides a benefit wherein it is easy to design and manufacture resilient support members capable of isolating vibrations for various kinds of electrical devices.

Furthermore, according to the present invention, use of the resilient support member reduces the number of required resilient members, which simplifies the overall structure and reduces the overall cost of the motorcycle.

According to a second feature of the present invention, in addition to the first feature, the second portion of the support plate is disposed at a position intermediate or between the first portion and the electrical device.

Accordingly, it is possible to provide a sufficient distance from the first portion, i.e., a fixed point to the electrical device, such that the resonance point of the resilient support member is set to a relatively low level. As a result, vibrations are effectively isolated from the electrical device when the motorcycle body is vibrating at a relatively low frequency.

According to a third feature of the present invention, in addition to the first feature, the electrical device is supported on the resilient support member at a position intermediate or between the first portion and the second portion.

Accordingly, it is possible to provide a short distance from the first portion, i.e., a fixed point to the electrical device, such that the resonance point of the resilient support member is set to a relatively high level. As a result, vibrations are effectively isolated from the electrical device when the motorcycle body is vibrating at a relatively high frequency. Also, because of the short distance from the fixed point to the electrical device, the operator of the motorcycle is able to acquire a satisfactory feeling of rigidity, i.e., a better operating feeling when the operator operates a switch operating element of a control switch unit.

The above-mentioned aspect, other aspects, characteristics, and advantages of the present invention will become apparent from a preferred embodiment that will be described in detail below by reference to the attached drawings.

DETAILED DESCRIPTION OF THE PREFERRED EMBODIMENTS

All expressions with reference to direction such as front, rear, left, right, horizontal and vertical used with regard to the preferred embodiments represent directions from a view point of a driver of the subject motorcycle.

Figure 1:
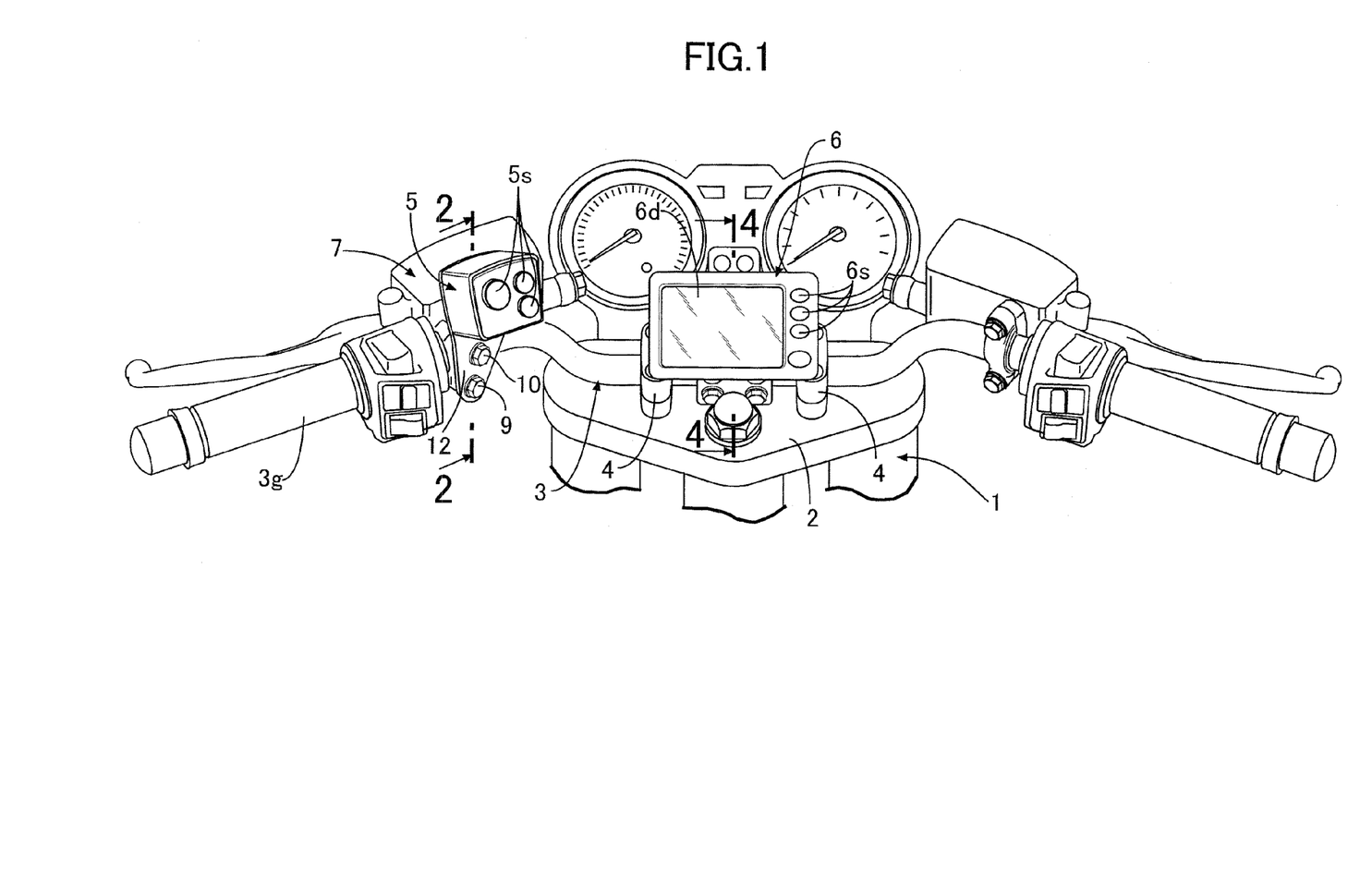
FIG. 1 is a front view of a steering handle of a motorcycle that includes a control switch unit mounting structure and a navigation unit mounting structure according to the present invention.

Referring to FIG. 1, a bar-shaped steering handlebar 3 is secured at a central portion to the top bridge 2 of the front fork 1 of a motorcycle by a pair of left and right handlebar holders 4, 4. A control switch unit 5 is mounted near the left grip 3g of the handlebar 3 by a mounting structure, according to a first embodiment of the present invention. A navigation unit 6 that is controllable by the control switch unit 5 is mounted to a central portion of the handlebar 3 by a mounting structure, according to a second embodiment of the present invention. A plurality of switch operating elements 5s are disposed on the front surface of the operator side of the control switch unit 5. The switch operating elements 5s are arranged as close to the left grip 3g as possible so that the operator can operate the switch operating elements 5s using a finger from the hand gripping the left grip 3g. A plurality of switch operating elements 6s are also disposed adjacent to a display 6d on the front surface of the navigation unit 6.

First, according to the first embodiment, the mounting structure of the control switch unit 5 will be described with reference to FIGS. 2 and 3. A clutch master cylinder 7 and a holder 8 are secured to the handlebar 3 and fastened to each other by a pair of upper and lower bolts 10 and 9, wherein the handlebar 3 is sandwiched therebetween.

A resilient support plate 12 for supporting the control switch unit 5 is made of, for example, spring steel to obtain a resiliency so the support plate 12 can be flexed in response to the vibration of the handlebar 3. The resilient support plate 12 has an electric device mounting portion 14 at an upper end for securing thereto the control switch unit 5 using a plurality of screws 13. Also, the resilient support plate 12 is configured to have a shape wherein a width thereof decreases in a direction taken from the electric device mounting portion 14 toward a lower end. A single first mounting bore 15 is provided in the lower end of the resilient support plate 12. Also, a single second mounting bore 16 is provided in the resilient support plate 12 at a position between or intermediate to the first mounting bore 15 and the electric device mounting portion 14. An elastic grommet 17, made of rubber or synthetic resin and having an attenuating property, is detachably mounted in the second mounting bore 15. The elastic grommet 17 includes a cylindrical portion 17a tightly fitted to an inner peripheral surface of the second mounting bore 16, and flanges 17b, 17b are integrally formed at opposite ends of the cylindrical portion 17a to clamp together opposite surfaces of the resilient support plate 12. A metal collar 18 is fitted to an inner periphery of the elastic grommet 17, and includes a flange 18a abutting against one end-face of the elastic grommet 17. In a free state, the cylindrical portion 17a of the elastic grommet 17 has a length larger than the collar 18 by a value corresponding to a compression amount.

To mount the resilient support plate 12 to the handlebar 3, the bolt 9 is sequentially inserted through the first mounting bore 15, a spacer 20, and a lower through-bore 8b in the holder 8, and threadedly engaged with, and fastened to, a lower threaded bore 7b in the clutch master cylinder 7, wherein a peripheral edge of the first mounting bore 15 in the resilient support plate 12 is secured to the steering handle 3.

The bolt 10 is sequentially inserted through the collar 18 within the elastic grommet 17, a washer 21 abutting against a lower end of the collar 18, the spacer 19, and an upper through-bore 8a in the holder 8, and is threadedly engaged with, and fastened to, an upper threaded bore 7a in the clutch master cylinder 7, wherein the elastic grommet 17 is compressed a predetermined amount between the flange 18a of the collar 18 and the washer 21, causing the collar 18 to be secured to the handlebar 3. In this manner, the peripheral edge of the second mounting bore 16 in the resilient support plate 12 is resiliently supported on the handlebar 3, with the elastic grommet 17 interposed therebetween in a pre-compressed state.

In order to improve the operator's visibility to the control switch unit 5, the electric device mounting portion 14 of the resilient support plate 12 is bent in a thicknesswise direction into a "<"-shape, such that the front surface of the control switch unit 5 is directed slightly upward with respect to a vertical portion having the first and second mounting bores 15 and 16.

In the above-described structure for mounting the control switch unit 5, when vibrations from the front fork 1 or an engine are transmitted to the handlebar 3 while the motorcycle is traveling down the road, the vibrations are absorbed by cooperation between a resonance effect of the resilient support plate 12 and an attenuating effect of the elastic grommet 17, wherein the vibrations are isolated from the control switch unit 5.

Also, the resilient support plate 12 has a spring-like flexural resilience, but allowing it to be easily secured to the handlebar 3 around the first mounting bore 15. Thus, when an operational load acts on the switch operating elements 5s of the control switch unit 5, the resilient support plate 12 exhibits a relatively large repulsive force that provides a feeling of rigidity to the operator. Therefore, the operator obtains a relatively good operational feeling.

Further, the resilient support plate 12 secured to the handlebar 3 isolates a plurality of different kinds of vibrations by adjusting the thickness and shape of the resilient support plate 12, as well as the position where the resilient support plate 12 is secured to the handlebar 3, i.e., the position of the first mounting bore 15 or other arrangement. As such, the resilient support plate can be designed and manufactured corresponding to the type and anticipated amount or level of vibrations that are to be isolated for various types of control switch units 5.

Furthermore, according to the present invention, the resilient support plate 12 reduces the number of resilient members that are required, thereby simplifying the structure of the motorcycle, which contributes to an overall cost reduction of the vehicle.

Moreover, because the control switch unit 5 is supported by the electric device mounting portion 14 at the upper end of the resilient support plate 12, it is possible to have a sufficient distance from the fixed point in the resilient support plate 12 to the control switch unit 5, thereby setting the resonance point of the resilient support plate 12 to a relatively low level. As a result, vibrations can effectively be isolated for the control switch unit 5 when the handlebar 3 is vibrated at a relatively low frequency.

Figure 2:
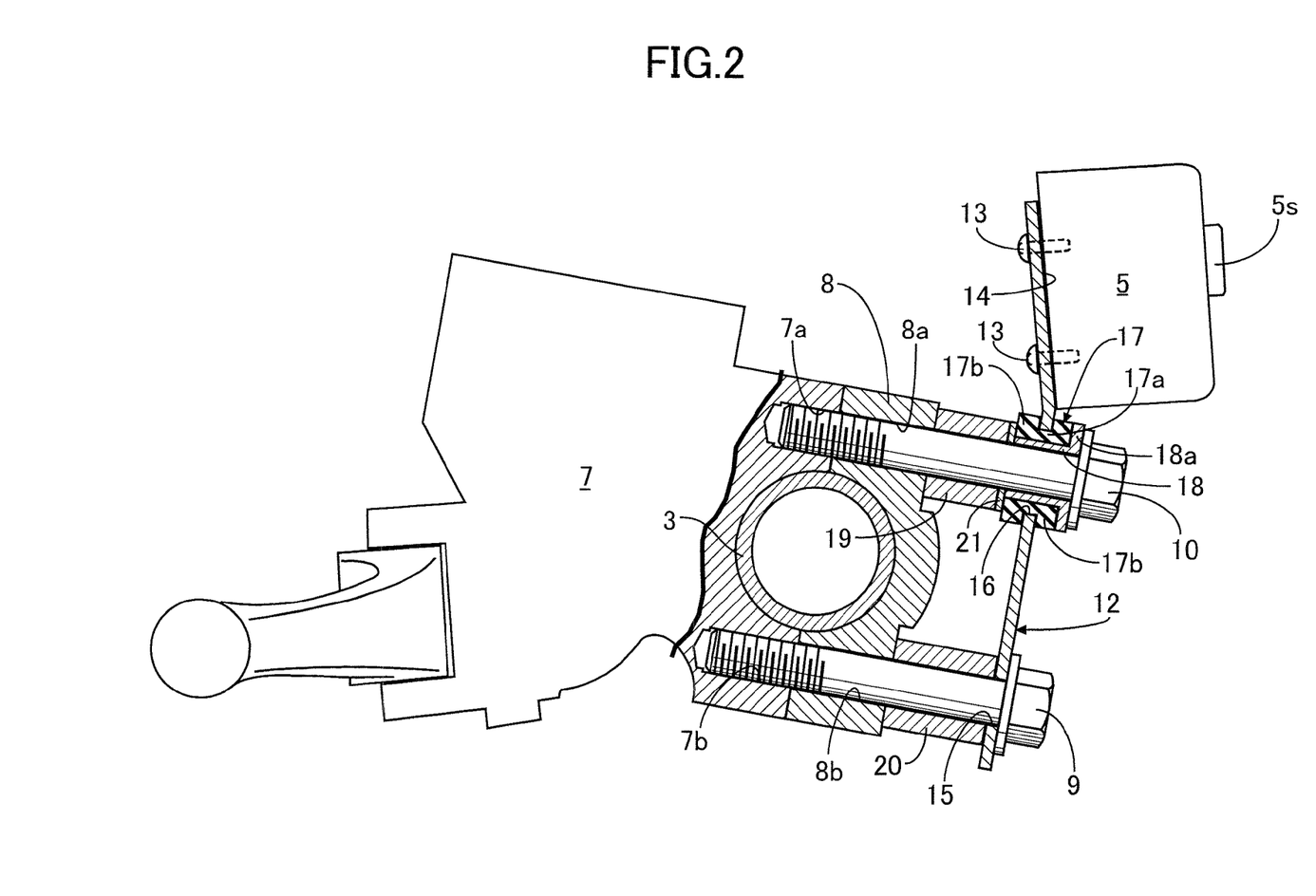
FIG. 2 is a partial cross-sectional view of the control switch unit mounting structure taken along line 2-2 in FIG. 1.
Figure 3:
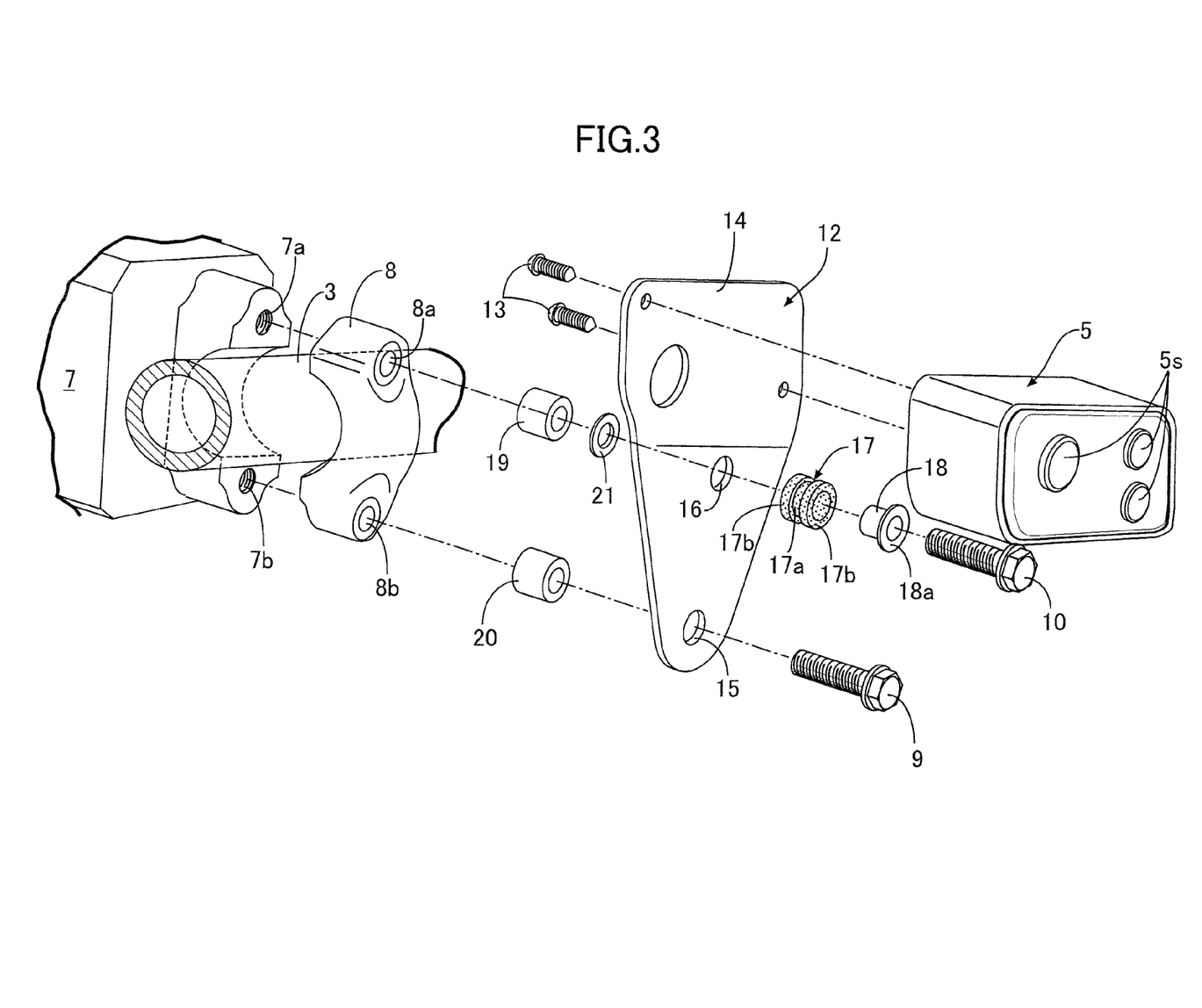
FIG. 3 is an exploded perspective view of the control switch unit mounting structure.

In addition, because the electric device mounting portion 14 of the resilient support plate 12 is bent in a thicknesswise direction into a "<"-shape with respect to a vertical portion having the first and second mounting bores 15 and 16, the electric device mounting portion 14 is sufficiently flexed with the vibration both in a vertical direction and left-right direction in FIG. 2, to absorb the vibration.

Yet further, the grommet 17 is detachably mounted in the second mounting bore 16 in the resilient support plate 12. Thus, when the attenuating property thereof changes over time, if the grommet 17 is replaced by a new elastic grommet, a desired attenuating property is easily provided.

On the other hand, the operator is able to operate the switch operating elements 5 only if the operator stretches a thumb from the hand gripping the left grip 3g of the handlebar 3 toward the control switch unit 5. In this case, the resilient support plate 12 supporting the control switch unit 5 has a flexural resilience, but is secured to the handlebar 3 around the first mounting bore 15. When an operating load acts on the switch operating elements 5, the resilient support plate 12 exhibits a relatively large repulsive force, which is transmitted to the operator as a feeling of rigidity. Therefore, the operator senses a relatively good operating feeling.

Figure 4:
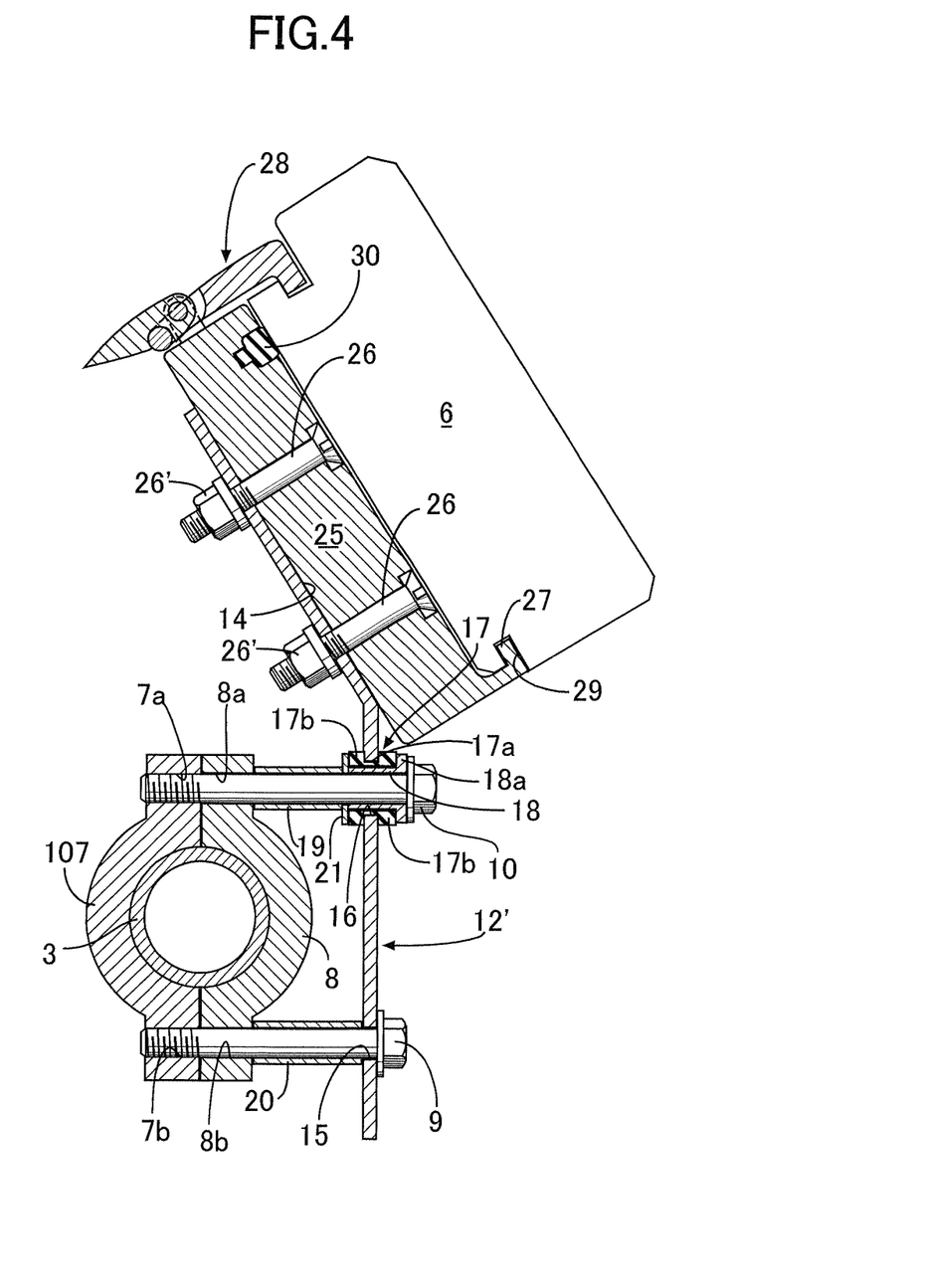
FIG. 4 is a partial cross-sectional view of the navigation unit mounting structure taken along line 4-4 in FIG. 1.
Figure 5:
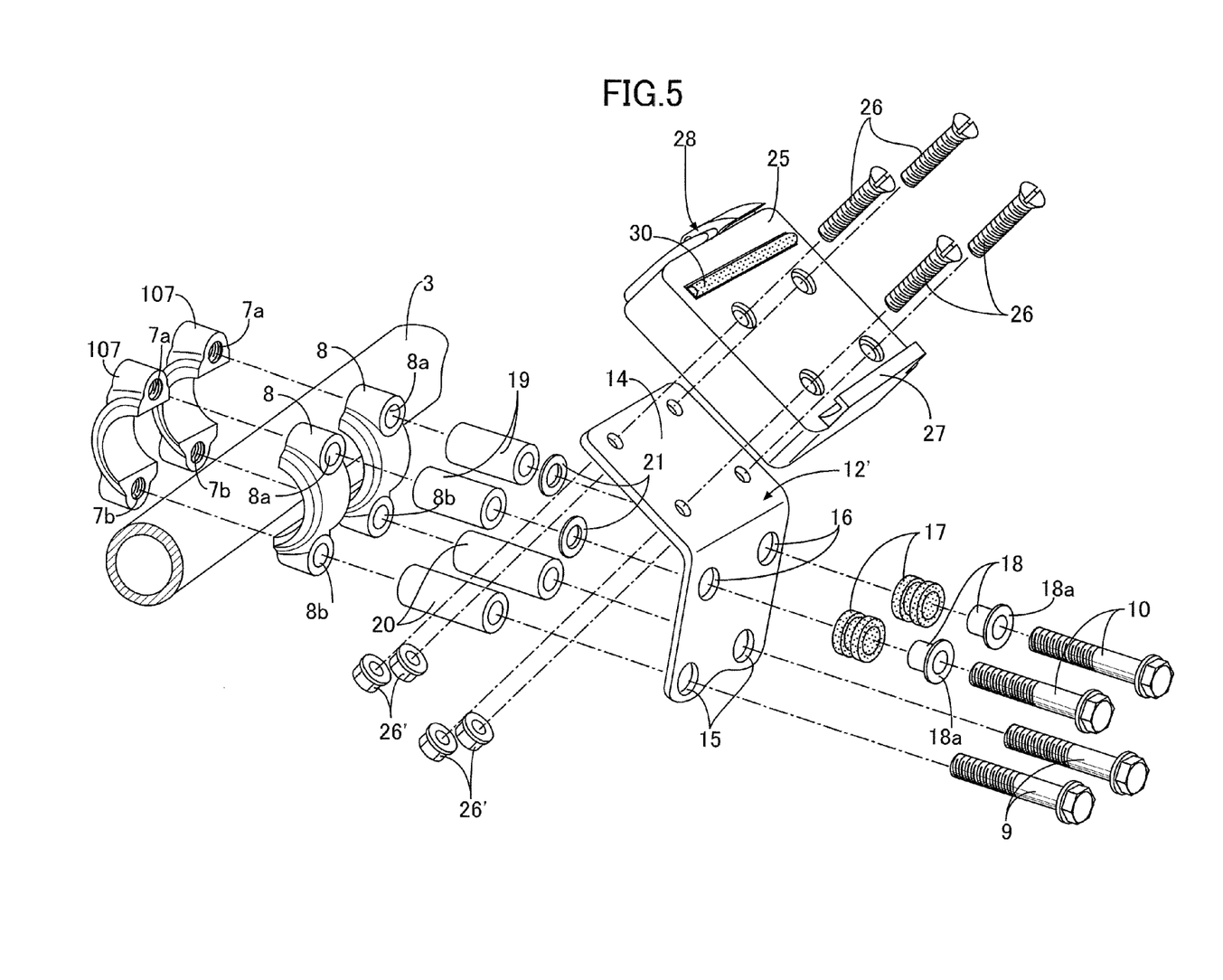
FIG. 5 is an exploded perspective view of the navigation unit mounting structure.

A structure for mounting the navigation unit 6, according to a second embodiment of the present invention, will be described below with reference to FIGS. 4 and 5. Left and right sets of front and rear holders 107, 8; 107, 8 are disposed at the central portion of the handlebar 3, causing each set to clamp the handlebar 3 from the front and rear. The holders 107, 8; 107, 8 are secured to the handlebar 3 by lower and upper sets of left and right bolts 9, 10; 9, 10. The resilient support plate 12' supporting the navigation unit 6 is mounted to the handlebar 3 by the holders 107, 8; 107, 8 and the bolts 9, 10; 9, 10.

The resilient support plate 12' has the same structure as that of the first embodiment except that the thickness of the resilient support plate 12' is larger than that of the resilient support plate 12 of the first embodiment in order to support the navigation unit 6, which is heavier than the control switch unit 5 described above with respect to the first embodiment. In this embodiment, there are provided two sets of left and right first mounting bores 15, 16 and 15, 16, which correspond to the two sets of left and right bolts 9, 10; 9, 10. Also, the structure of mounting the resilient support plate 12' to the handlebar 3 through the holders 107, 8, by use of the sets of first and second mounting bores 15, 16 and the sets of bolts 9 and 10, is basically the same as that in the first embodiment. Therefore, in FIGS. 4 and 5, components corresponding to those of the first embodiment are denoted by the same reference numerals and symbols, and redundant descriptions thereof are omitted.

Because the structure used to support the navigation unit 6 by the electric device mounting portion 14 of the resilient support plate 12' is different from that in the first embodiment, a unit base 25 is secured to the electric device mounting portion 14 of the resilient support plate 12' by a plurality of bolts 26 and nuts 26'. The unit base 25 includes a hook-shaped locking claw 27 at a lower end, and a known locking mechanism 28 at an upper end. The navigation unit 6 is detachably attached to the unit base 25 by bringing the locking claw 27 into engagement with a locking groove 29 in a lower surface of the navigation unit 6, and pulling the upper end of the navigation unit 6 toward the unit base 25 by using the locking mechanism 28. A cushion rubber 30 is fitted into the unit base 25 so as to be compressed between the unit base 25 and a rear face of the navigation unit 6.

Also in the above-described structure for mounting the navigation unit 6, as in the case of the first embodiment, when a vibration of the front fork 1 or the engine is transmitted to the handlebar 3 while the motorcycle is traveling down the road, the vibration is isolated from the navigation unit 6 and absorbed due to cooperation between a resonance effect of the resilient support plate 12' and an attenuating effect of the elastic grommet 17.

Figure 6:
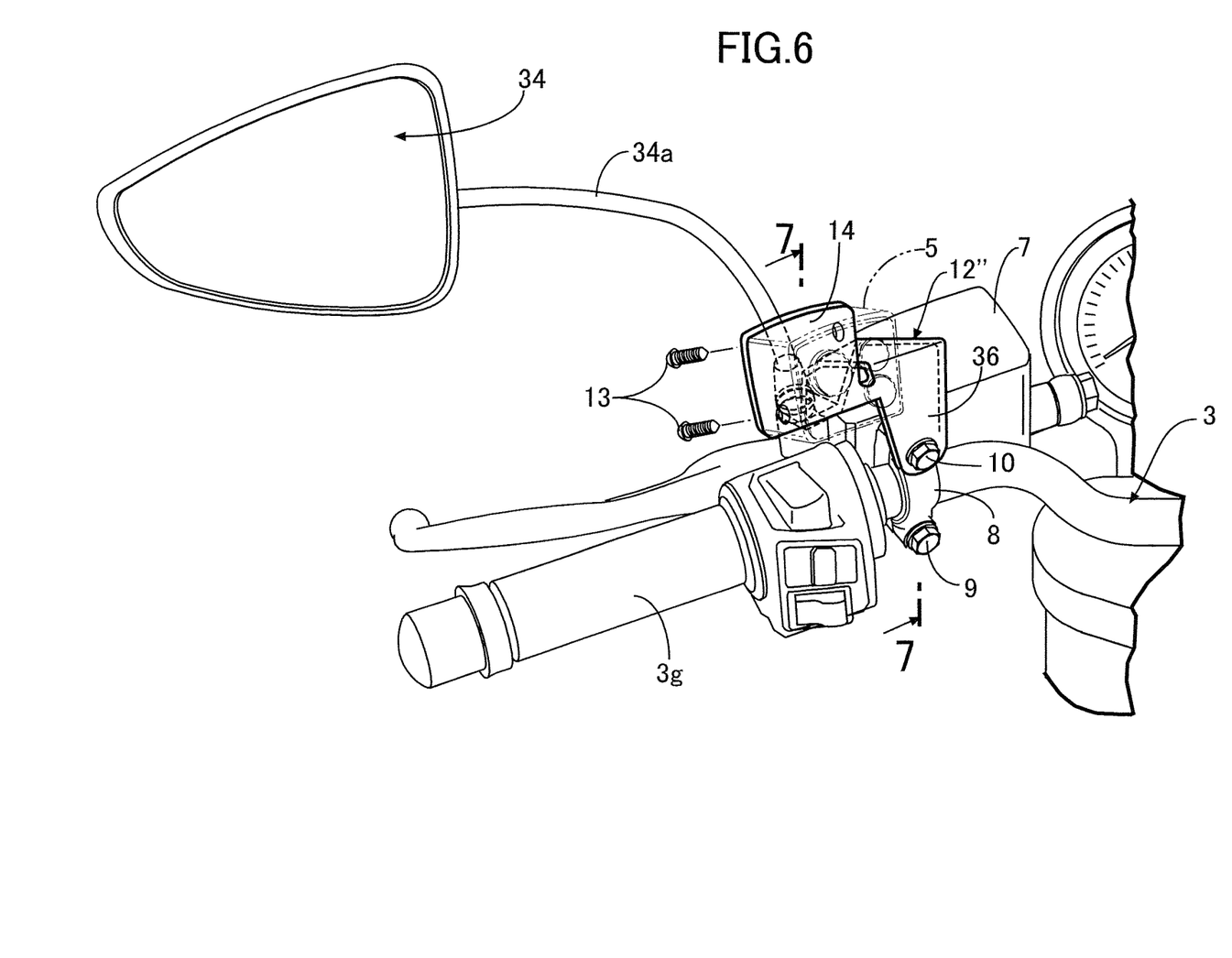
FIG. 6 is a front view of the present invention similar to FIG. 1, but showing a control switch unit according to another embodiment of the present invention.
Figure 7:
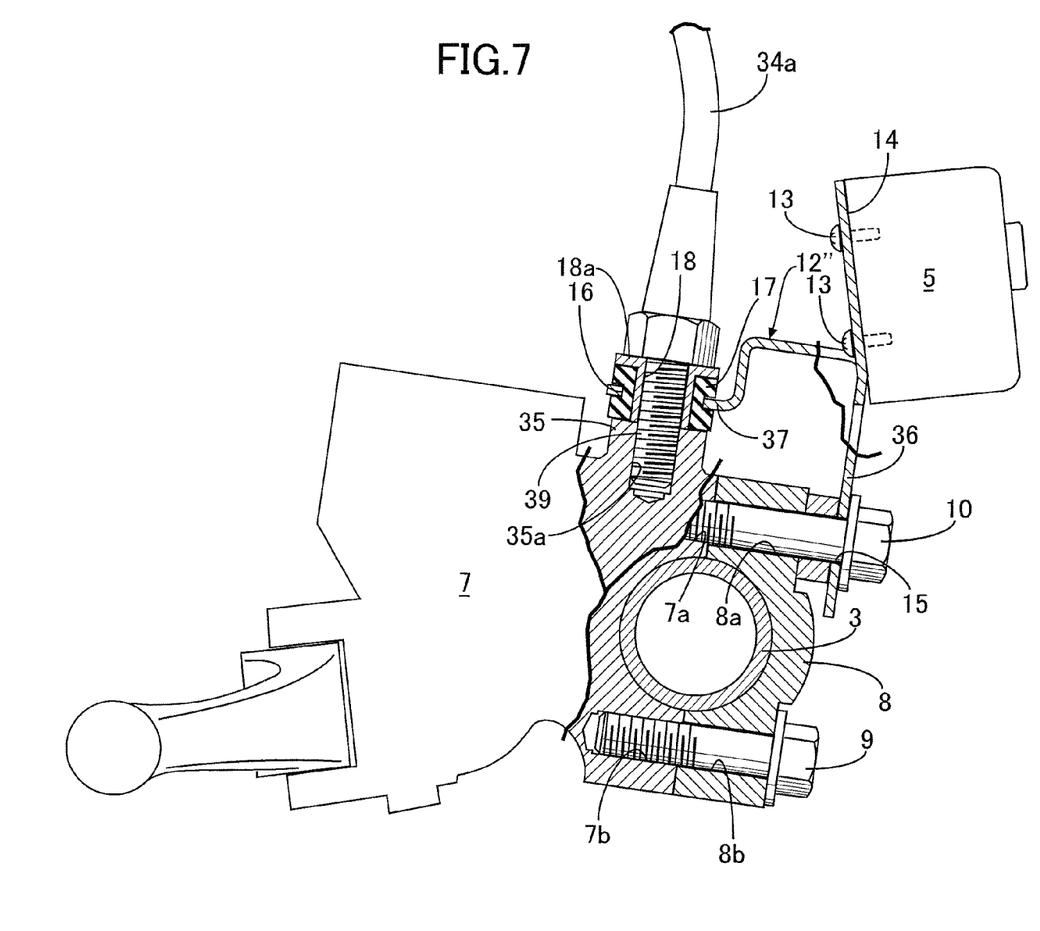
FIG. 7 is a partial cross-sectional view taken along line 7-7 in FIG. 6.

A third embodiment of the present invention shown in FIGS. 6 and 7 will be described below.

In the third embodiment, in order to facilitate operation of the switch operating elements 5 using a finger of the operator's hand while gripping the grip 3g, the control switch unit 5 is mounted as close as possible to the grip 3g by a resilient support plate 12". The support plate 12" is resiliently supported by a mirror-mounting boss 35 formed on a clutch master cylinder 7 and a stay 34a of a rearview mirror 34 threadedly secured to the mirror-mounting boss 35. More specifically, the resilient support plate 12" includes a vertical portion 36 having a first mounting bore 15 defined in a lower end; a horizontal portion 37 having a second mounting bore 16 defined in a front end and which is bent forward from an upper end of the vertical portion 36 along a thickness direction of the resilient support plate 12"; and a electric device mounting portion 14 extending from the upper end of the vertical portion 36 toward the grip 3g. Thus, a peripheral edge of the first mounting bore 15 is secured to the handlebar 3 through the holder 8 such that a bolt 10 passing through the first mounting bore 15 in the vertical portion 36 and the lower through-bore 8a in the holder 8 is threadedly fitted and fastened to the upper threaded bore 7a in the clutch master cylinder 7.

As in the first embodiment described above, elastic grommet 17 is mounted in a horizontal portion 37 of the second mounting bore 16; a collar 18 having a flange 18a is fitted to an inner side of the elastic grommet 17; and a lower end face of the elastic grommet 17 is superposed on an upper end of the mirror-mounting boss 35. Thus, if the bolt 39 integrally connected to a lower end of a stay 34a of the rearview mirror 34 is passed through the collar 18 and threadedly fitted and fastened to a threaded bore 35a in the mirror-mounting boss 35, a pre-compressing load is applied to the elastic grommet 17 so that an amount of compression is controlled by the lower end of the collar 18 abutting against the upper end of the mirror-mounting boss 35. In this manner, the peripheral edge of the second mounting bore 16 in the resilient support plate 12 is resiliently supported, via the elastic grommet 17, on the clutch master cylinder 7 and, thus, on the handlebar 3.

In this case, the bolt 9 inserted through the lower through-bore 8b in the holder 8 and threadedly fitted and fastened to the lower threaded bore 7b in the clutch master cylinder 7, is not included in the mounting of the control switch unit 5.

The other components are substantially the same as those in the first embodiment. Therefore, the components illustrated in FIGS. 6 and 7, corresponding to the same components in the previously discussed first embodiment, are denoted using the same reference numerals and symbols, and a description thereof is omitted to avoid any redundancy.

According to the third embodiment, the control switch unit 5, supported on the electric device mounting portion 14, can be mounted at a position closer to the grip 3g at a distance corresponding to a distance through which the electric device mounting portion 14 of the resilient support plate 12 extends from the vertical portion 36 including the first mounting bore 15 toward the grip 3g. Therefore, the operator can easily operate the switch operating elements 5 using a finger from the hand gripping the grip 3g, leading to improved operability. In addition, an intermediate position between the fixed point of the lower end of the resilient support plate 12 and the electric device mounting portion 14 is supported on the handlebar 3 with the grommet 17 interposed therebetween, thereby reducing the distance from the fixed point of the resilient support plate 12 to the control switch unit 5. Therefore, it is possible to set the resonance point of the resilient support plate 12 to a relatively high level, which is effective in isolating the vibration from the control switch unit 5 when the handlebar 3 vibrates at a relatively high frequency. Also, because of the short distance from the fixed point of the resilient support plate 12 to the control switch plate 5, the operator obtains a sufficient feeling of rigidity, i.e., a good operating feeling, when operating the switch operating elements 5s of the control switch unit 5.

Figure 8:
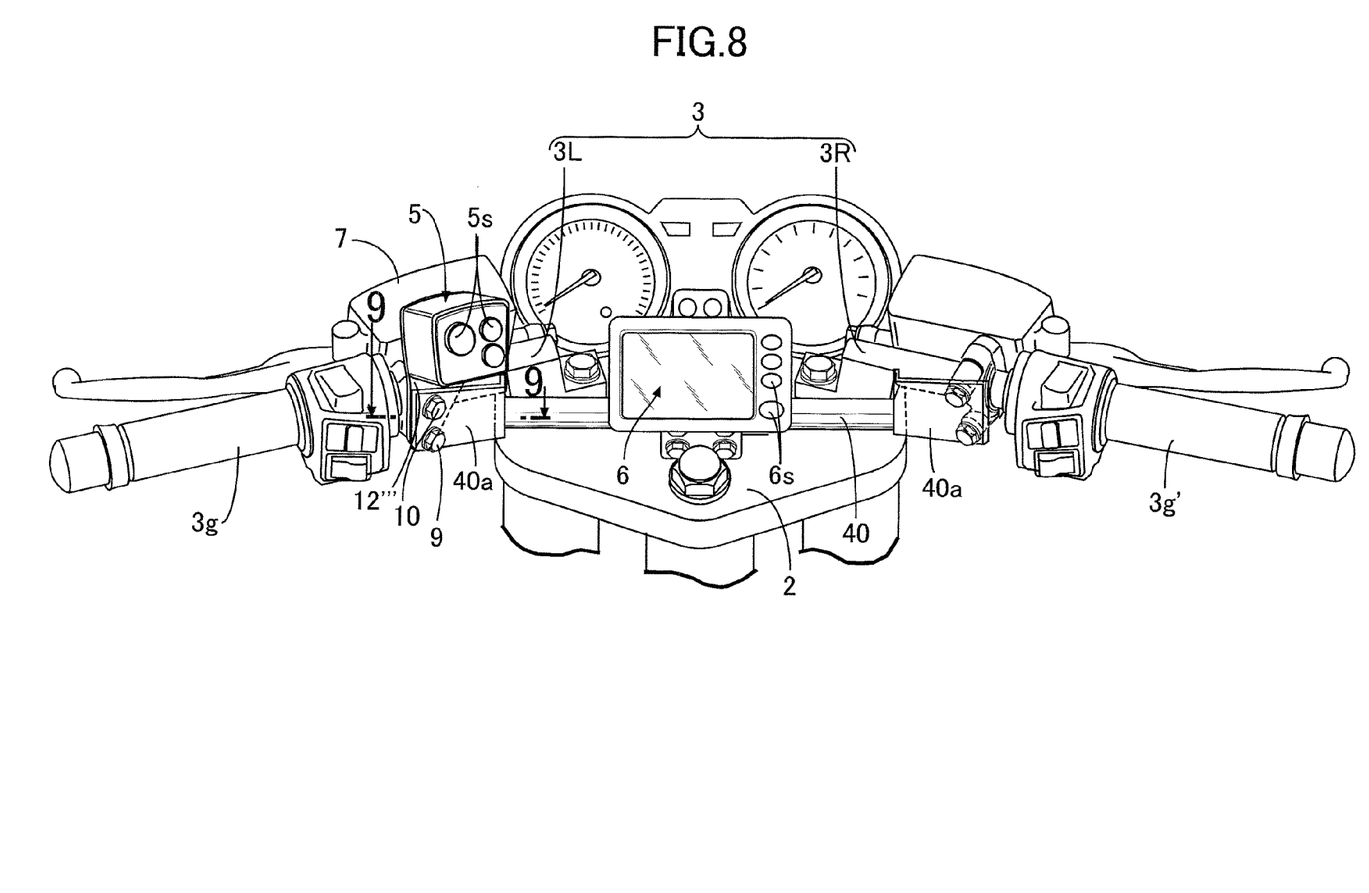
FIG. 8 is a front view of the present invention similar to FIG. 1, but showing yet another embodiment of the present invention.
Figure 9:
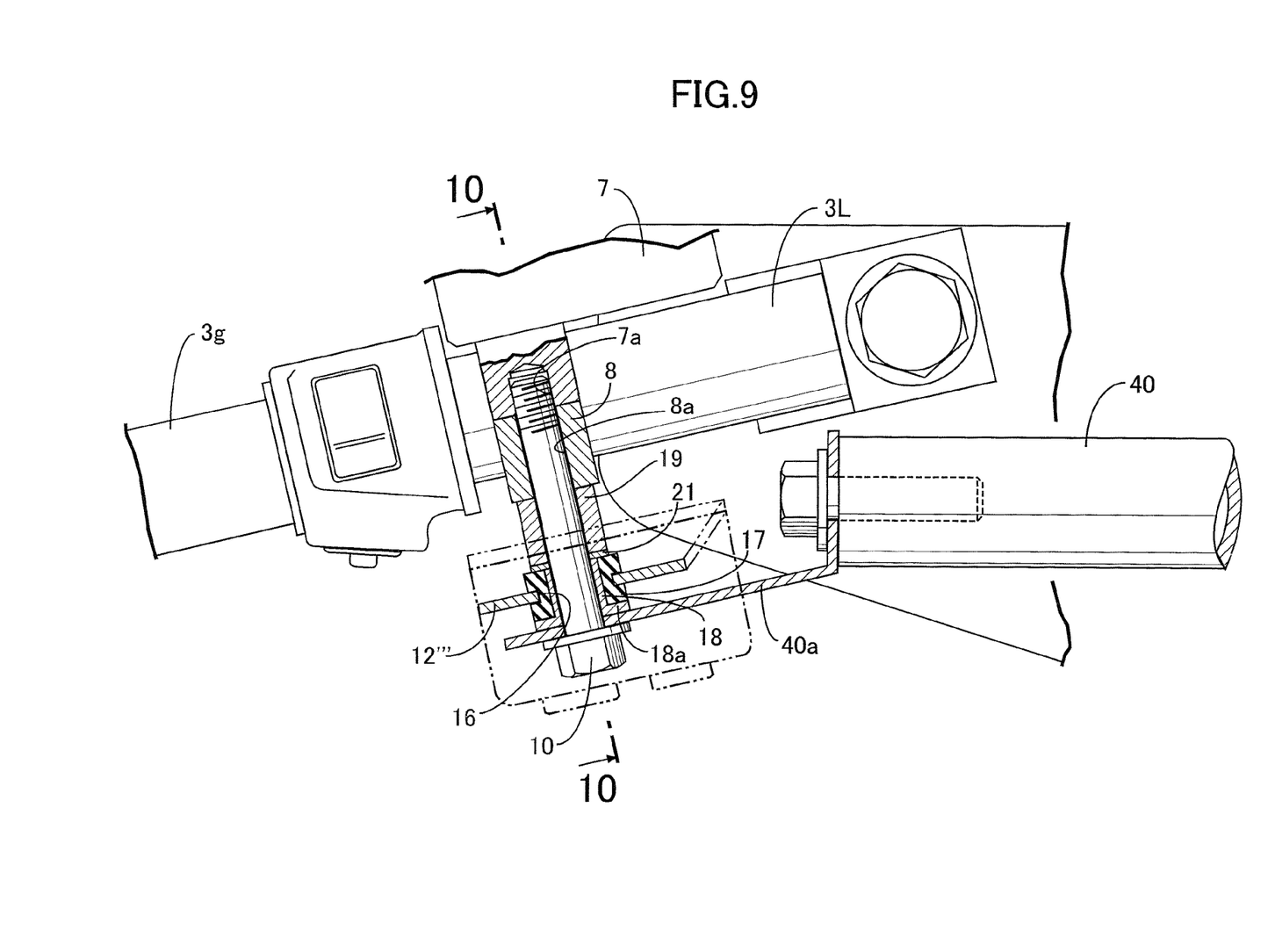
FIG. 9 is a partial cross-section view taken along line 9-9 in FIG. 8.
Figure 10:
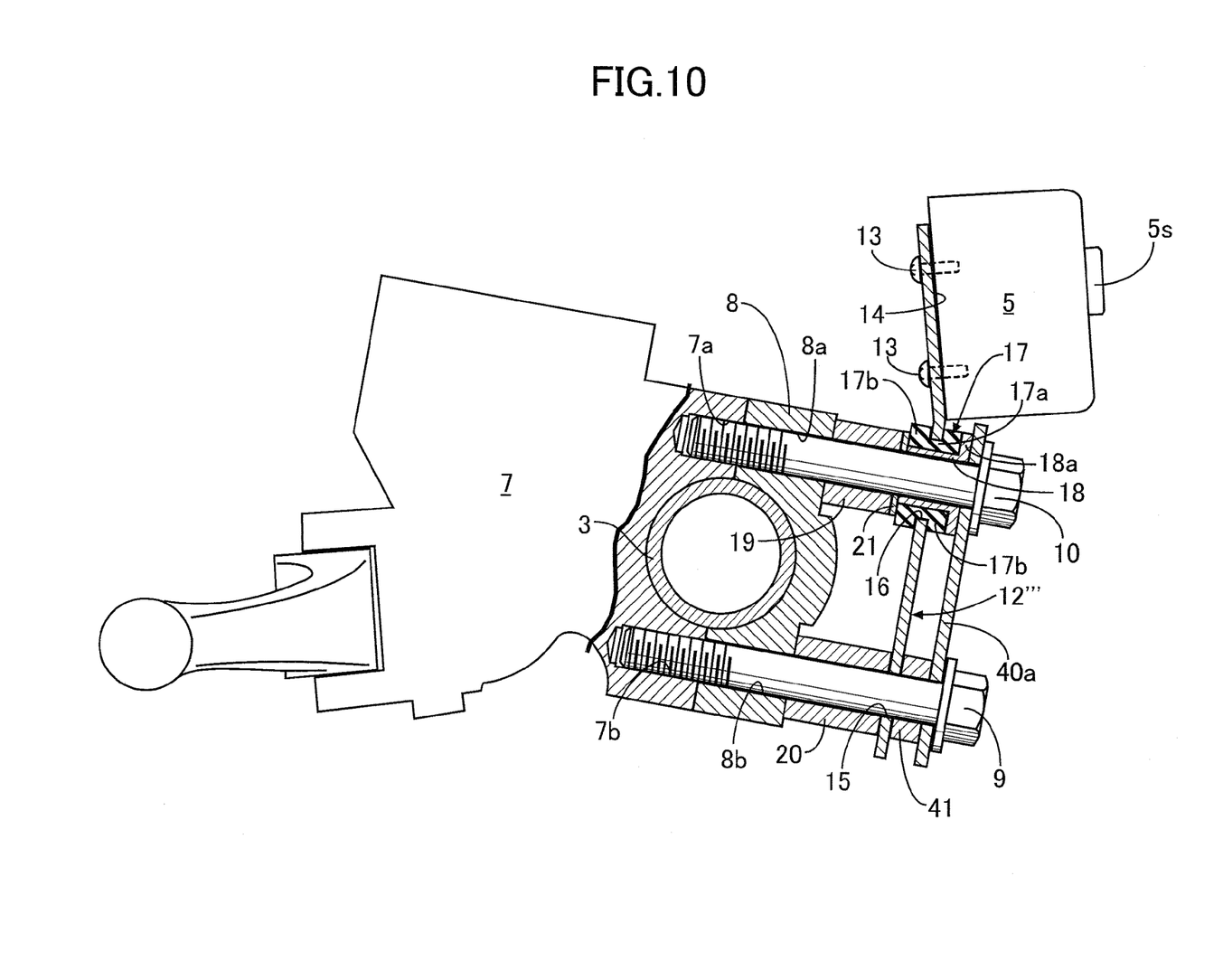
FIG. 10 is a partial cross-sectional view taken along line 10-10 in FIG. 9.

A fourth embodiment of the present invention, which is shown in FIGS. 8 to 10, will be described below.

In the fourth embodiment, the handlebar 3 is divided into two parts: a left handlebar 3L having a left grip 3g; and a right handlebar 3R having a right grip 3g'. The parts 3L, 3R are individually secured to a top bridge 2 and connected to each other by a cross bar 40. The resilient support plate 12''' supporting the control switch unit 5 is mounted to the left handle bar 3L using the same mounting structure as in the first embodiment. Also, a lower portion of a bracket 40a at a left end of the cross bar 40 is superimposed on the resilient support plate 12''' with a spacer 41 interposed therebetween, and is secured to the left handle bar 3L by a bolt 9, while an upper portion of the bracket 40a is superimposed on the flange 18a of the collar 18 fitted in the elastic grommet 17, and is secured thereto by a bolt 10. In the structure used to mount the resilient support plate 12''' to the left handle bar 3L, components corresponding to those of the first embodiment are denoted by the same reference numerals and symbols, and a description thereof is omitted to avoid any redundancy.

A navigation unit 6 is mounted to a central portion of the cross bar 40 using the same mounting structure as that in the second embodiment.

The present invention is not limited to the above-described embodiments, and various changes thereto may be made without departing from the subject matter of the present invention. For example, the thickness of the resilient support plate (12, 12', 12" and 12'''), and the number of the first and second mounting bores 15 and 16 may be varied as desired, corresponding to the weight, shape and other specifications of an electrical device supported by the resilient support plate (12, 12', 12" and 12'''). In the case where a plurality of the second mounting bores 16 are provided, if the distances between the plurality of second mounting bores 16 and the first mounting bore 15 are made different from one another, or if the attenuating properties of the elastic grommets 17 attached to the plurality of second mounting bores 16 are made different from each other, it is possible to isolate the vibrations having different numbers, amplitudes, wavelengths, and the like, from the electric devices. Also, the fixed end of the resilient support plate (12, 12', 12" and 12'''), can be fixed to a vehicle body or a member connected to the vehicle body by any other securing means, such as welding, crimping, or the like, in place of the bolts 9. The resilient support plate (12, 12', 12" and 12''') can also be secured to a vehicle body frame, as well as to the front fork 1, and further to a cowling, a meter visor, or the like, connected to the front fork or the vehicle body frame. Further, an elastic bushing can be used in place of the elastic grommet, and clip-engagement can be used in place of the screw-engagement. In this case, the detachability and elastic support strength of the elastic bushing can be changed as desired in accordance with the properties of the clip, thereby providing a degree of freedom in design.

What is claimed is:

1. An electrical device mounting structure on a motorcycle, comprising:
    a resilient support member having a spring-flexural resilience; and
    an elastic member having an attenuating property,
    the resilient support member including:
        an electrical device mounting portion for mounting thereon an electrical device;
        a first portion having at least one first bore defined therein and secured to either a vehicle body or a member connected to the vehicle body; and
        a second portion having at least one second bore defined therein, the second portion being positioned intermediate the electrical device mounting portion and the first portion relative to a longitudinal direction of the resilient support member, wherein the second portion is connected to the vehicle body via the elastic member,
    wherein the elastic member is mounted in the at least one second bore, the elastic member comprising a cylindrical portion fit to an inner peripheral surface of the at least one second bore and a pair of flanges integrally formed at opposite ends of the cylindrical portion to clamp together opposite surfaces of the resilient support member, and
    wherein the first portion is rigidly secured to the vehicle body or the member connected to the vehicle body free of any elastic member.

2. The mounting structure according to claim 1, wherein the second portion is disposed at a position located between the first portion and the electrical device.

3. The mounting device according to claim 1, wherein the first portion is a vertical portion; the second portion is a horizontal portion; and the horizontal portion and the electric device mounting portion extending from an upper end of the vertical portion.

4. The mounting device according to claim 1, further comprising left and right brackets provided on left and right handlebars of the motorcycle in order to provide crosslinking therebetween, wherein the left bracket has at least two mounting portions at a left end thereof; the right bracket has at least two mounting portions at a right end thereof; at least one of the mounting portions is secured while clamping the first portion of the resilient support member; and at least the other of the mounting portions is secured while clamping the second portion of the resilient support member via the elastic member.

5. The mounting structure according to claim 1, wherein the electric device mounting portion extends obliquely relative to a base portion of the resilient support member containing the first and second portions.

6. An electrical device mounting structure on a motorcycle, comprising:
    a resilient support member having a spring-flexural resilience; and
    an elastic member having an attenuating property,
    the resilient support member including:
        an electrical device mounting portion for mounting thereon an electrical device;
        a first portion having at least one first bore defined therein and secured to either a vehicle body or a member connected to the vehicle body; and a second portion having at least one second bore defined therein and provided on the resilient support member, positioned on a side of the electrical device mounting portion from a view point of the first portion, and connected to the vehicle body via the elastic member, wherein the resilient support member is formed of a single plate and the electrical device mounting portion is formed continuously with at least one of the first portion and the second portion via a bent portion provided therebetween, and wherein the first portion is rigidly secured to the vehicle body of the member connected to the vehicle body free of any elastic member.

7. The mounting structure according to claim 6, wherein the second portion is disposed at a position located between the first portion and the electrical device.

8. The mounting structure according to claim 6, wherein the electrical device is supported on the resilient support member at a position located between the first portion and the second portion.

9. The mounting structure according to claim 6, wherein the elastic member is mounted in the at least one second bore.

10. The mounting device according to claim 6, wherein the first portion is a vertical portion; the second portion is a horizontal portion; and the horizontal portion and the electric device mounting portion extending from an upper end of the vertical portion.

11. The mounting device according to claim 6, further comprising left and right brackets provided on left and right handlebars of the motorcycle in order to provide crosslinking therebetween, wherein the left bracket has at least two mounting portions at a left end thereof; the right bracket has at least two mounting portions at a right end thereof; at least one of the mounting portions is secured while clamping the first portion of the resilient support member; and at least the other of the mounting portions is secured while clamping the second portion of the resilient support member via the elastic member.

12. The mounting structure according to claim 6, wherein the electric device mounting portion extends obliquely relative to a base portion of the resilient support member containing the first and second portions.

* * * * *